United States Patent [19]
Turner

[11] Patent Number: 5,734,239
[45] Date of Patent: Mar. 31, 1998

[54] AUTOMATIC GENERATOR START UP AND SHUT OFF DEVICE

[76] Inventor: William W. Turner, 22116 26th Ave. East, Bradenton, Fla. 34202

[21] Appl. No.: 504,397

[22] Filed: Jul. 19, 1995

[51] Int. Cl.$^6$ .................................. H02P 5/20
[52] U.S. Cl. .................. 318/142; 318/140; 318/143; 322/7; 307/43; 123/179.19
[58] Field of Search .................. 318/142, 140, 318/143; 322/7, 8, 17, 18, 100, 99, 44, 69; 307/43, 64, 85, 86; 123/179.19, 179.1

[56] References Cited

U.S. PATENT DOCUMENTS

| | | | |
|---|---|---|---|
| 4,788,487 | 11/1988 | Picklesimer | 322/8 X |
| 5,085,183 | 2/1992 | Firey | 123/179.19 X |
| 5,268,850 | 12/1993 | Skoglund | 307/43 X |

Primary Examiner—Karen Masih
Attorney, Agent, or Firm—Charles J. Prescott

[57] ABSTRACT

A device and method for continuously monitoring the availability of an external electric power supply into a recreational vehicle such as a motor home, a boat and the like and controlling the operation of an onboard engine powered generator to serve as an alternate source of electric power for the recreational vehicle. After a predetermined initial time delay following external power source failure, the device activates the cranking motor for a predetermined cranking time period to attempt to start the engine. After another predetermined waiting time period, the cranking motor will be reactivated for the cranking time period if the engine has failed to start and supply electric power to the recreational vehicle. As soon as external electric power is restored, the engine is automatically shut off by the device.

6 Claims, 2 Drawing Sheets

AUTOMATIC GENERATOR START UP AND SHUT OFF DEVICE

BACKGROUND OF THE INVENTION

1. Scope of Invention

This invention relates generally to electrical systems of recreational vehicles such as motor homes and boats and more particularly to a control device which will automatically start an onboard engine powered generator when an external electrical power source is interrupted.

2. Prior Art

Recreational vehicles such as motor homes and larger boats and yachts depend upon a dual source of a/c electrical power to run the various electrical components on these motor homes and boats. When available, the preferred power source is external such as that provided by a municipality and is interconnected and supplied to motor homes and boats by an elongated power cord with connections at each end to accomplish the electrical tie-in. Should an external power supply be unavailable or during traveling, an onboard engine driven generator will supply these electrical needs.

In many instances, the external electrical power supply may be interrupted for either short durations or for longer periods of time, causing considerable inconvenience and potential equipment damage if not promptly replaced with an alternate electrical source. In all instances known to applicant, no automatic control device or transferring mechanism is available for recreational vehicles and boats which will automatically attempt to start the onboard generator and then supply electrical power to the onboard equipment when the generator is running and ready for power delivery.

A number of prior art devices have been described in the following U.S. patents which provide a system for alternately supplying electrical power when a municipal power source fails. However, none of these systems are easily adapted to a recreational vehicle such as a motor home or a boat.

| | |
|---|---|
| Papachristou | 3,691,393 |
| Kita et al. | 5,229,650 |
| Pittet | 3,808,451 |
| Lagree et al. | 4,672,227 |
| Roesel, Jr. | 4,412,170 |
| Paul et al. | 5,198,698 |
| Skoglund | 5,268,850 |

One patented device invented by Picklesimer as described in U.S. Pat. No. 4,788,487 teaches a control onboard device which calls for the use of an onboard generator for a recreational vehicle when a thermostat calls for the operation of the onboard air conditioning system. However, this system has nothing to do with providing an alternate source of electrical power when the external power source fails or is otherwise interrupted.

The present invention provides an economical and reliable control system and method of operation which, after a preselected time delay following the interruption or failure of an external electric power source, will energize a cranking motor of an engine-driven generator, sense whether the generator has become operational after another predetermined time delay, and then continue to repeatedly attempt to start the generator if the previous attempt has failed. Because onboard recreational vehicle generators are sometimes difficult to start, built-in predetermined cranking time periods and a preselected limited number of cranking motor activation attempts to prevent engine or starter damage are provided.

BRIEF SUMMARY OF THE INVENTION

This invention is directed to a device and method for continuously monitoring the availability of an external electric power supply into a recreational vehicle such as a motor home, a boat and the like and controlling the operation of an onboard engine powered generator to serve as an alternate source of electric power for the recreational vehicle. After a predetermined initial time delay following external power source failure, the device activates the cranking motor for a predetermined cranking time period to attempt to start the engine. After another predetermined waiting time period, the cranking motor will be reactivated for the cranking time period if the engine has failed to start and supply electric power to the recreational vehicle. As soon as external electric power is restored, the engine is automatically shut off by the device.

It is therefore an object of this invention to provide a control device and method of sensing external power source interruption and time delayed sequencing of activating the cranking motor of an engine-powered generator for alternate electrical power supply of a recreational vehicle such as motor homes and boats.

It is yet another object of this invention to provide a controlled persistent restart attempt means for an engine-powered onboard generator of a motor home or a boat without damaging the engine or its cranking motor.

It is still another object of this invention to provide a retrofit control device for existing motor homes and boats having an onboard electrical generator which automatically attempts generator start up after the external electrical power source is interrupted or fails.

In accordance with these and other objects which will become apparent hereinafter, the instant invention will now be described with reference to the accompanying drawings.

DETAILED DESCRIPTION OF THE INVENTION

Figure 1:
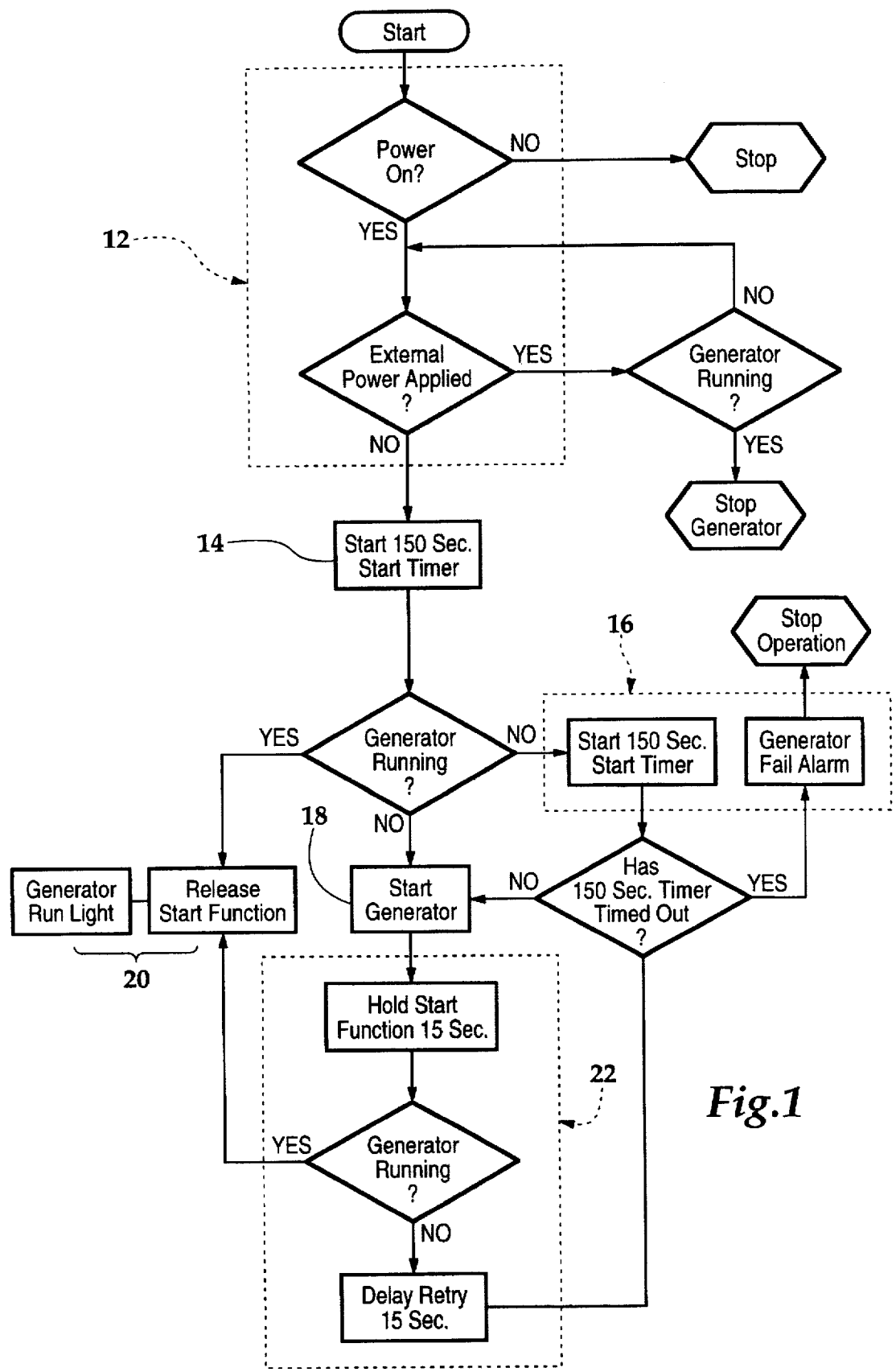
FIG. 1 is a logic flow diagram of the control device and method.
Figure 2:
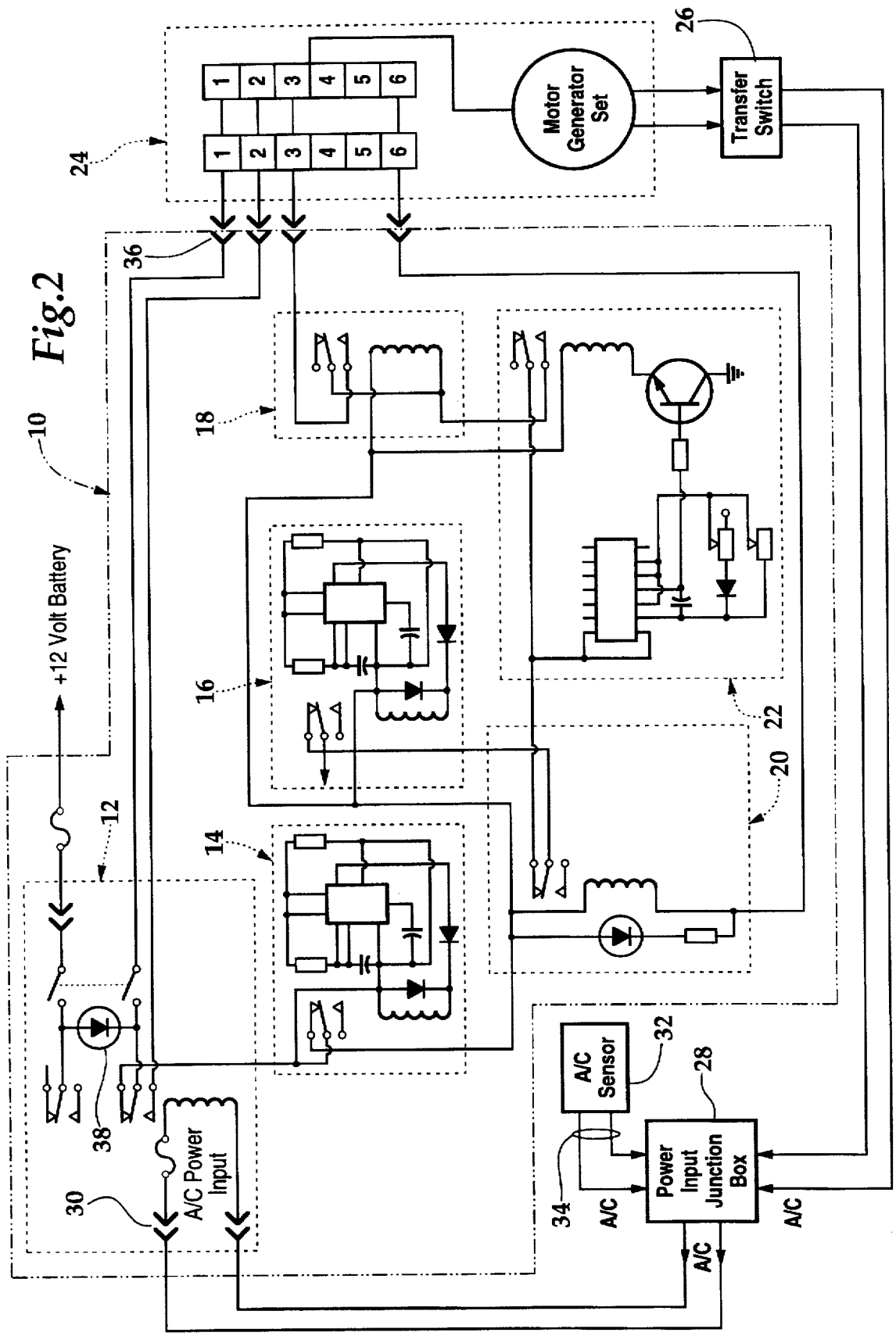
FIG. 2 is a schematic diagram of the control device.

Referring now to the drawings, the invention is generally shown at numeral 10 and is interconnected to the electrical system of the recreational vehicle, such as a motor home or boat, at 30 and 36. The control system 10 includes an electric input power monitor section 12 which, on an ongoing basis, senses the availability of a/c electrical power from an external source 32 such as the electrical supply system of a municipality to the recreational vehicle. This external electrical power source 32 is connected to a power input junction box 28 of the recreational vehicle by means of a flexible, weather resistant power supply cord 34 via an external electrical inlet of the recreational vehicle.

When the electrical power monitor section 12 senses the interruption of external electrical power from the junction box 28, a 150 second time delay is automatically started at 14. This time delay is provided to allow onboard electrical equipment which has just experienced the loss or interruption of electrical power to restabilize and reset itself. After this initial 150 second time delay, a first attempt to start an onboard engine-driven generator 24 is called for by circuit portion 16. This initial start attempt delivers 12 volt d.c. power from an onboard storage battery to the generator 24 for a period of 15 seconds. After the cranking motor has been energized for a start time of 15 seconds, the control system 10 continues to sense the availability of an electrical power supply at 12 and if no electrical power supply is yet available, the circuit portion 16 again, after a predetermined time delay of 15 seconds, calls for another attempt to start the gas engine of the generator 24.

This engine start-up procedure continues until the circuit portion 20 senses that the engine of the generator 24 is running and operationally providing electrical power output from an automatic transfer switch 26 to the junction box 28 or when a predetermined number of failed starter cranking attempts have been completed. In the preferred embodiment, after five engine cranking attempts of 15 seconds each with 15 second delays in between each attempt have been unsuccessfully performed at 16 and 22 of this circuit 10, a generator fail alarm in circuit portion 16 advises the operator of unsuccessful generator engine start attempts.

Once the generator 24 is operational, viewable indicia 38 in the form of a green panel light within circuit portion 20 is provided to so advise the operator. During this operational time period, the circuit 10 continues to monitor the availability of incoming external power supply and, when restored, as sensed by circuit portion 12, the circuit portion 12 controls stoppage of the engine of generator 24.

In summary, the device and method provide for the automatic start-up of an onboard generator of the motor home or boat after a time delay of 150 seconds following the interruption or failure of the external power supply to the motor home or boat. After that initial time delay, the cranking motor of the engine-driven generator is activated repeatedly until either an attempt is successful to start the generator or a predetermined summary time period for starter cranking is reached. Between each generator starting attempt, a built-in time delay of 15 seconds is provided followed by another 15 second cranking motor energizing time period. As soon as the external power supply is restored, the circuit then calls for the immediate termination of generator operation.

When the device 10 is non-operational, a separate manually actuated switch of the existing equipment remains functional for manual generator start up.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An automatic generator start up and shut off device for use in combination with an engine-powered generator of an electric system for a motor home or a boat which also has a connection for receiving electric current from an external electric power supply, comprising:

a first means for sensing on an ongoing basis whether electric current is available from said external electric power supply;

a second means for activating a cranking motor of said engine for a first predetermined time period immediately following a second predetermined time period and only after interruption of said external power supply regardless of whether the electric system is using electric current;

a third means for sensing whether electric current is available from said generator after said second means has attempted to start said generator;

a fourth means for reactivating said second means if said engine has failed to start;

a fifth means for stopping said engine when electric current becomes available from said external power supply.

2. An automatic generator start up and shut down device as disclosed in claim 1, wherein:

said fourth means includes:

a sixth means for repeatedly activating said second means a preselected number of times.

3. In combination with an electrical system of a motor home or boat which selectively receives electric current from either an external electric power supply or an internally mounted engine driven generator, said engine having a cranking motor for starting, an automatic generator engine start up and shut down device comprising:

a first means for sensing on an ongoing basis whether electric current from said external electric power supply has been interrupted;

a second means for activating said cranking motor for a first predetermined time period immediately following a second predetermined time period after interruption of said external power supply occurs regardless of whether there is any electric current being received by the electric system;

a third means for sensing whether said generator has started after said second means has been activated;

a fourth means for repeatedly reactivating said second means a predetermined number of times if said engine has failed to start;

a fifth means for stopping said engine when electric current becomes available from said external power supply.

4. A method of automatically controlling the operation of a motor home or boat engine driven generator which supplies electric current for use in the motor home or boat when an eternal electric power supply is interrupted comprising the steps of:

A. Continuously sensing whether electric power is being supplied to the motor home or boat from said external electric power supply;

B. activating a cranking motor of said engine for a predetermined cranking time period after a predetermined time delay following interruption of said external electric power supply regardless of whether electric current is being used by the motor home or boat;

C. determining whether said generator is operating;

D. reactivating the cranking motor for the cranking time period if the engine has failed to start;

E. stopping the engine when said external electric power supply is restored.

5. A method as set forth in claim 4, further comprising the step of:

F. repeating step D a predetermined number of times after which, if said engine has failed to start, actuating a warning indicia.

6. In combination with an electrical system of a motor home or boat which selectively receives electric current from either an external electric power supply or an internally mounted engine driven generator, said engine having a cranking motor for starting, an automatic generator engine start up and shut down device consisting essentially of:

means for sensing on an ongoing basis whether electric current from said external electric power supply has been interrupted;

means for activating said cranking motor for a first predetermined time period immediately following a second predetermined time period after interruption of said external power supply occurs regardless of whether there is any electric current being received and used by the electric system;

means for stopping said engine only when electric current becomes available from said external power supply.

* * * * *